United States Patent
Hubbert

(10) Patent No.: US 11,888,660 B2
(45) Date of Patent: Jan. 30, 2024

(54) BAND FILTER FOR FILTERING A DISCRETE TIME SERIES SIGNAL

(71) Applicant: University Corporation for Atmospheric Research, Boulder, CO (US)

(72) Inventor: John Clark Hubbert, Fort Collins, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 0 days.

(21) Appl. No.: 17/513,153

(22) Filed: Oct. 28, 2021

(65) Prior Publication Data

US 2023/0140050 A1 May 4, 2023

(51) Int. Cl.
*H04L 27/148* (2006.01)

(52) U.S. Cl.
CPC .................. *H04L 27/148* (2013.01)

(58) Field of Classification Search
CPC .... H04B 1/385; H04B 5/0031; H04B 5/0075; H04B 5/0081; H04B 5/02; H04B 7/26; H04B 1/123; H04B 1/1018; H04B 1/1036; H04B 1/18; H04B 2001/1063; H04L 27/148; G01S 7/295; G01S 13/106;
(Continued)

(56) References Cited

U.S. PATENT DOCUMENTS

| 5,307,517 A * | 4/1994 | Rich ................... | H04B 1/1036 |
| | | | 455/295 |
| 5,632,272 A * | 5/1997 | Diab .................... | H04B 1/123 |
| | | | 600/323 |

(Continued)

FOREIGN PATENT DOCUMENTS

EP 1257051 A2 * 11/2002 ............... H03D 3/06

OTHER PUBLICATIONS

Hans Torp, "Clutter Rejection Filters in Color Flow Imaging: A Theoretical Approach", IEEE Transactions on Ultrasounics, Ferroelectrics, and frequency control, Mar. 1997, pp. 417-424, vol. 44, No. 2.

Apg Hoeks et al, "An Efficient Algorithm to Remove Low Frequency Doppler Signals in Digital Doppler Systems", Ultrasonic Imaging, 1991, pp. 135-144, vol. 13, Academic Press, Inc.

Anthony P Kadi et al, "On the Performance of Regression and Step-Initialized IIR Clutter Filters for Color Doppler Systems in Diagnostic Medical Ultrasound", IEEE Transactions on Ultrasonics, Ferroelectronics, and Frequency Control, Sep. 1995, vol. 42, No. 5, pp. 927-937.

(Continued)

*Primary Examiner* — Lana N Le
(74) *Attorney, Agent, or Firm* — The Ollila Law Group LLC

(57) ABSTRACT

A band filter (100, 200) for filtering a discrete time series signal (110) is provided. The band filter (100, 200) includes an input frequency shifter (120, 220) configured to frequency down shift the discrete time series signal (110, 210) to provide a frequency down shifted discrete time series signal (120a, 220a), a regression based zero frequency centered band filter (130, 230) communicatively coupled to the input frequency shifter (120, 220), the regression based zero frequency centered band filter (130. 230) being configured to filter the frequency down shifted discrete time series signal (120a, 220a) to provide a filtered and frequency down shifted discrete time series signal (130a, 230a), and an output frequency shifter (140, 240) communicatively coupled to the regression based zero frequency centered band filter (130, 230), the output frequency shifter (140, 240) being configured to frequency up shift the filtered and frequency down shifted discrete time series signal (130a, 230a).

15 Claims, 9 Drawing Sheets

(58) Field of Classification Search
CPC .... G01S 13/0209; G01S 13/286; G01S 13/30; G01S 7/034

See application file for complete search history.

(56) References Cited

U.S. PATENT DOCUMENTS

| | | | | |
|---|---|---|---|---|
| 5,657,022 | A * | 8/1997 | Etten | G01S 13/30 342/107 |
| 5,853,364 | A * | 12/1998 | Baker, Jr. | A61B 5/02416 600/323 |
| 6,188,880 | B1 * | 2/2001 | Sanielevici | H04B 1/30 455/305 |
| 7,289,835 | B2 * | 10/2007 | Mansfield | A61B 5/1455 600/316 |
| 7,515,645 | B2 * | 4/2009 | Zschunke | H04L 27/18 375/348 |
| 7,696,460 | B1 * | 4/2010 | Spencer | G01S 13/0209 342/104 |
| 10,746,852 | B2 * | 8/2020 | Adib | G01S 13/5244 |
| 10,788,568 | B1 * | 9/2020 | Loui | G01S 13/0209 |
| 11,228,471 | B2 * | 1/2022 | Li | H04B 1/123 |
| 2002/0168035 | A1 * | 11/2002 | Carlson | H04B 1/385 375/350 |
| 2006/0003722 | A1 * | 1/2006 | Tuttle | H04B 1/10 455/285 |
| 2008/0033266 | A1 * | 2/2008 | Diab | A61B 5/14546 600/336 |
| 2008/0076374 | A1 * | 3/2008 | Grenader | H04B 1/123 455/307 |
| 2009/0182211 | A1 * | 7/2009 | Diab | A61B 5/7214 702/191 |
| 2010/0202566 | A1 * | 8/2010 | Fudge | H04L 27/148 375/340 |
| 2014/0266939 | A1 * | 9/2014 | Baringer | H01Q 7/00 343/729 |
| 2014/0273858 | A1 * | 9/2014 | Panther | A61B 5/1123 455/41.2 |
| 2014/0275850 | A1 * | 9/2014 | Venkatraman | A61B 5/02427 600/595 |
| 2015/0133068 | A1 * | 5/2015 | Aggarwal | H03H 19/002 455/176.1 |
| 2016/0261442 | A1 * | 9/2016 | Fu | H04L 27/148 |
| 2016/0269868 | A1 * | 9/2016 | Su | H04B 1/385 |
| 2020/0191934 | A1 * | 6/2020 | Maniwa | G01S 13/288 |
| 2020/0200887 | A1 * | 6/2020 | Hubbert | G01S 13/20 |

OTHER PUBLICATIONS

Tom O'Haver, "Intro. to Signal Processing:Smoothing", https://terpconnect.umd.edu/~toh/spectrum/Smoothing.html, Apr. 12, 2021, pp. 1-15.

Steven W. Smith, Ph.D, "The Scientist and Engineer's Guide to Digital Signal Processing", Chapter 14, Introduction to Digital Filters / High-Pass, Band-Pass andBand-Reject Filters, https://www.dspguide.com/ch14/5.htm, Apr. 12, 2021, pp. 1-3.

Julius O Smith III, "Spectral Audio Signal Processing", W3K Publishing, 2011, ISBN 978-0-9745607-3-1, https://ccrma.stanford.edu/~jos/sasp/Making_Bandpass_Filter_Lowpass.html, Center for Computer Research in Music and Acoustics (CCRMA), Stanford University, Apr. 12, 2021, p. 1.

"Savitzky-Golay filter vs. IIR or FIR linear filter—Signal Processing Stack Exchange", https://dsp.stackexchange.com/questions/52219/savitzky-golay-filter-vs-iir-or-fir-linear-filter, Apr. 12, 2021, pp. 1-11.

Steinar Bjaerum et al, "Clutter Filter Design for Ultrasound Color Flow Imaging", IEEE Transactions on Ultrasonics, Ferroelectrics, and Frequency Control, vol. 49, No. 2, Feb. 2002.

M. Sachidananda et al, "Systematic Phase Codes for Resolving Range Overlaid Signals in a Doppler Weather Radar", Journal of Atmospheric and Oceanic Technology, Oct. 1999, pp. 1351-1363, vol. 16.

Sebastian M Torres et al, "Ground Clutter Canceling with a Regression Filter", Journal of Atmospheric and Oceanic Technology, vol. 16, pp. 1364-1372, 1999, American Meteorological Society.

Frederick J Harris et al, "On the Use of Windows for Harmonic Analysis with the Discrete Fourier Transform", Proceedings of the IEEE, vol. 66, No. 1, Jan. 1978, pp. 51-83.

Frank E. Harrell, Regression Modeling Strategies: With Applications to Linear Models, Logistic and Ordinal Regression, and Survival Analysis (Springer Series in Statistics) 2nd ed. 2015 Edition, p. 24.

* cited by examiner

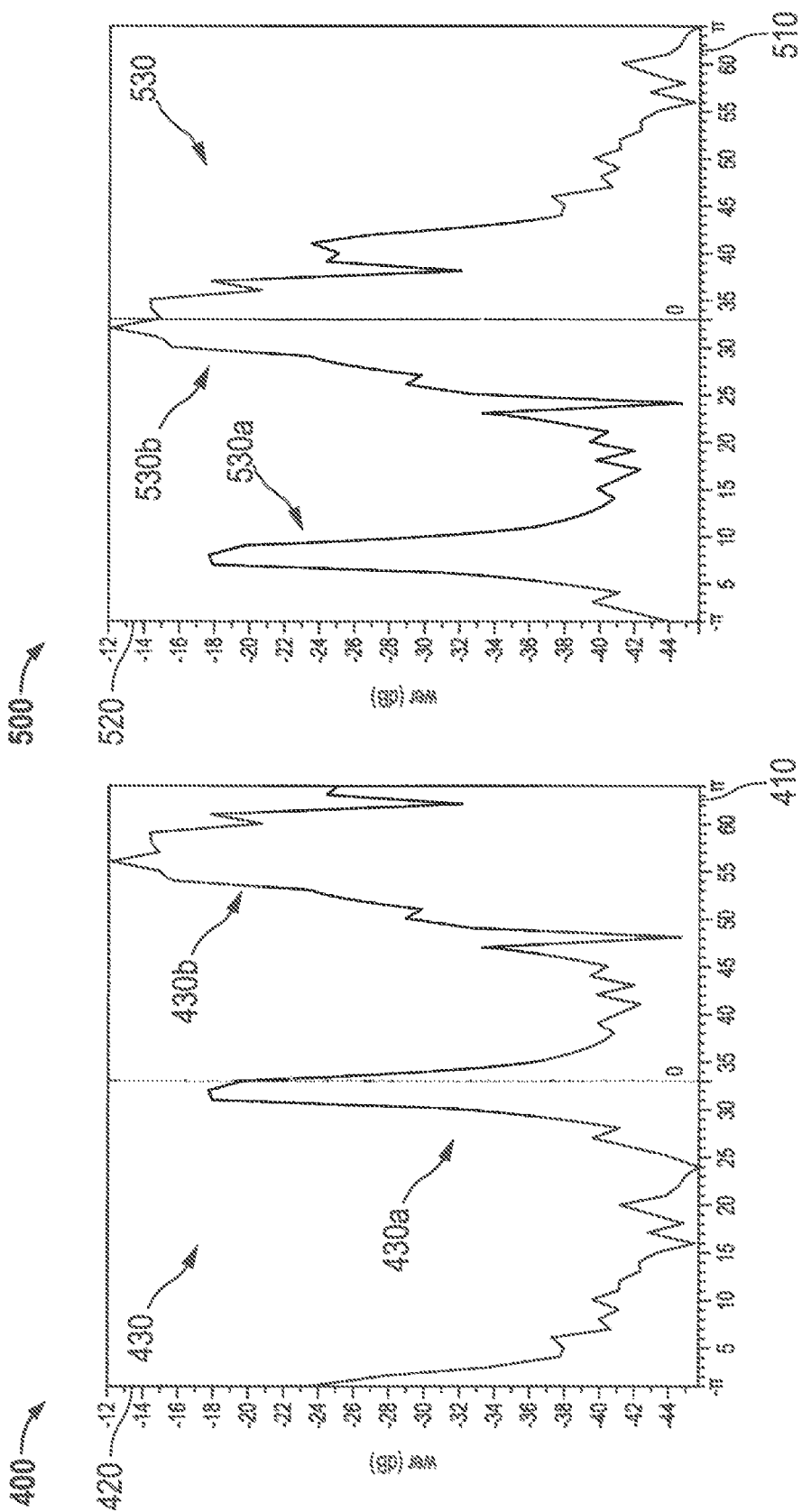

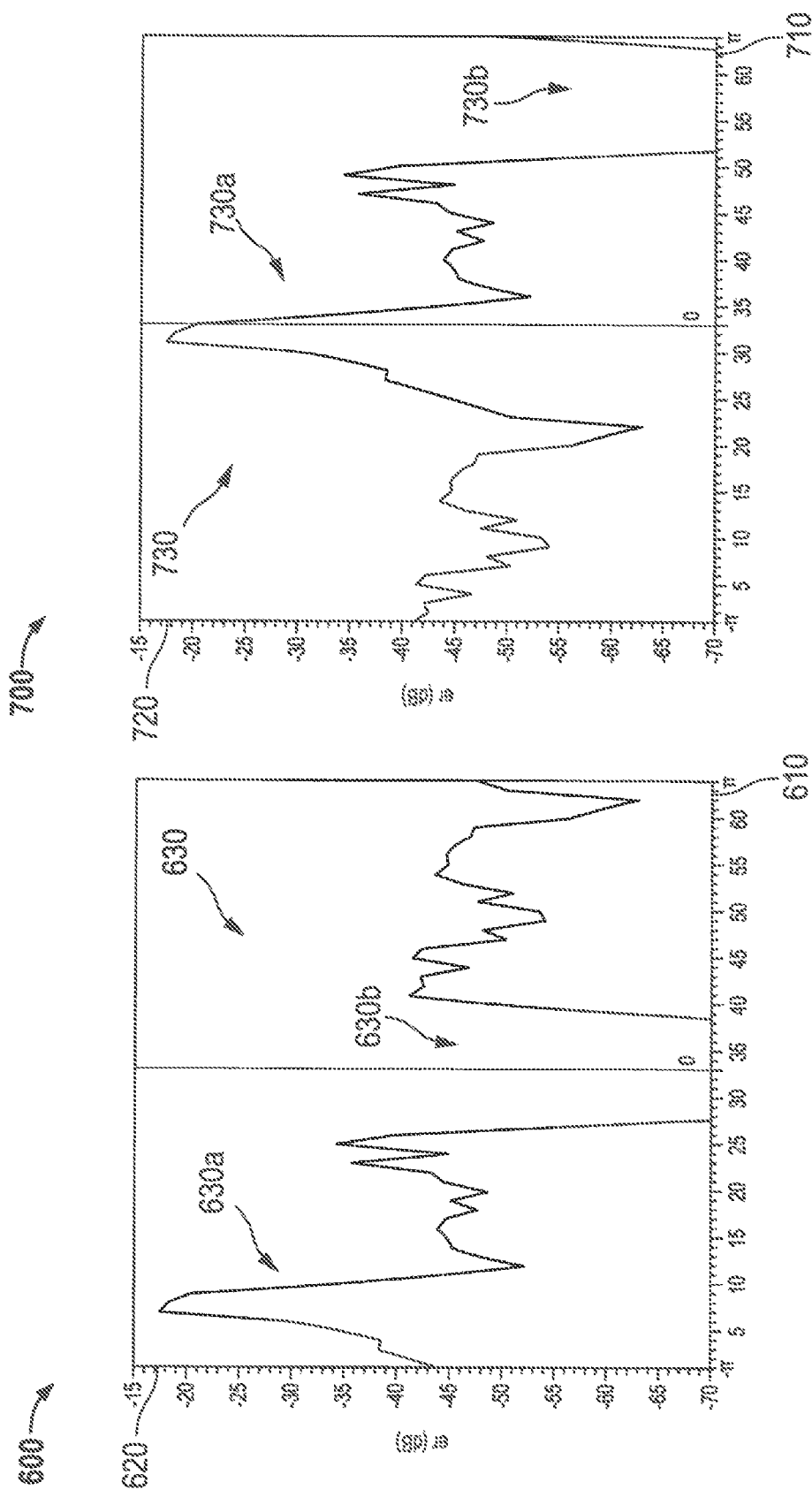

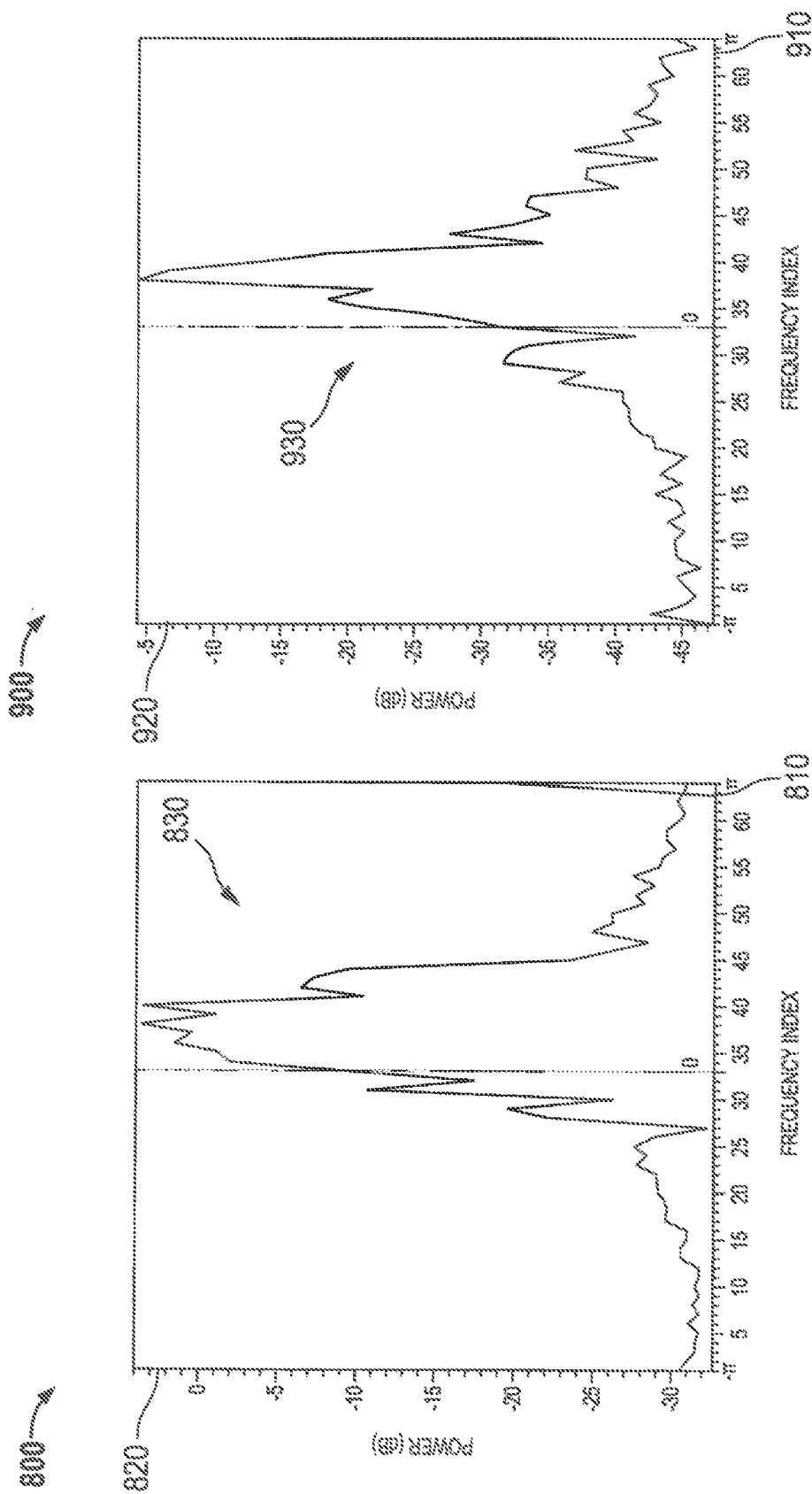

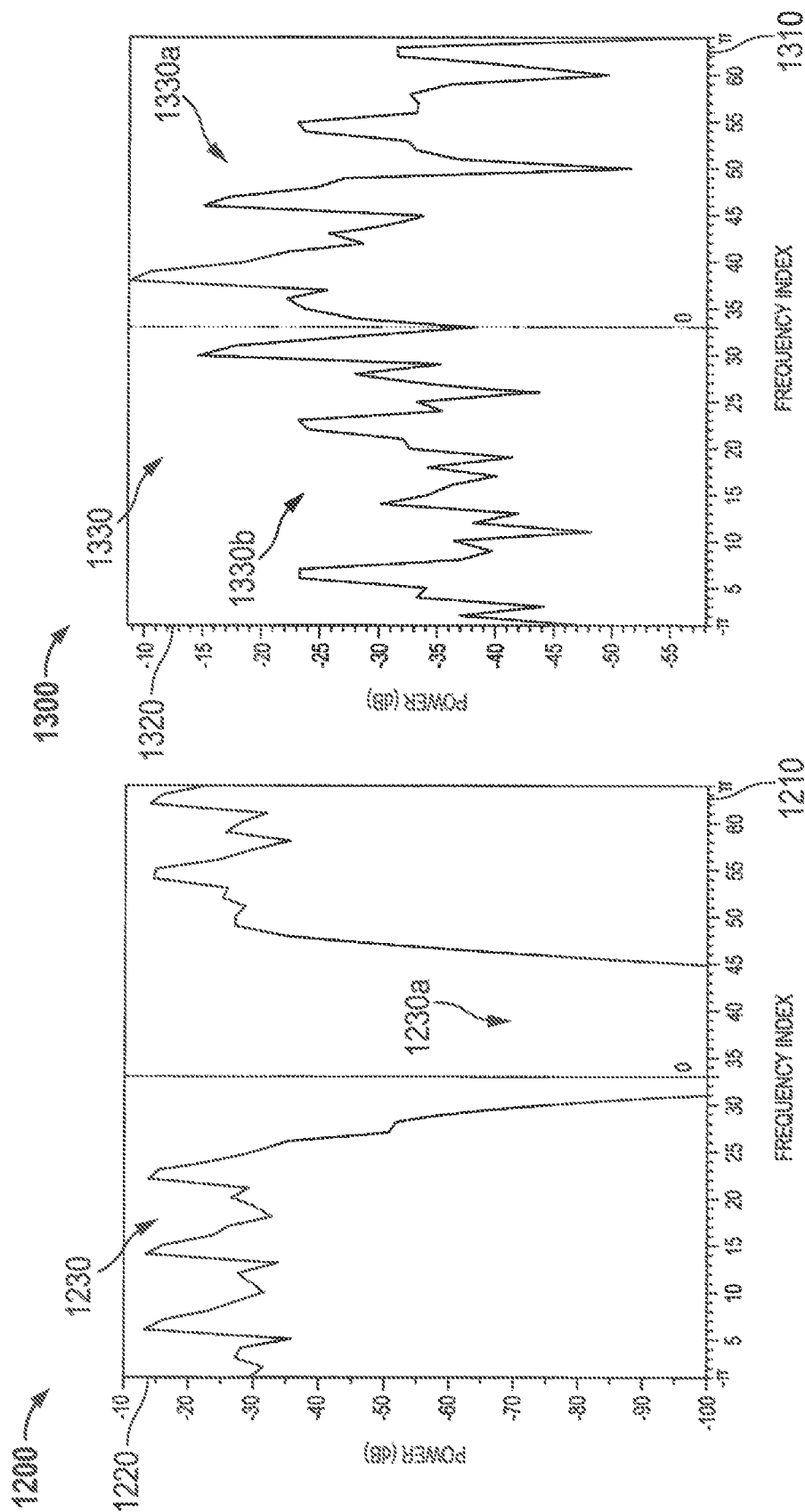

BAND FILTER FOR FILTERING A DISCRETE TIME SERIES SIGNAL

GOVERNMENT LICENSE RIGHTS

This invention was made with United States Government support under awards 1755088 awarded by the National Science Foundation. The Government has certain rights in this invention.

TECHNICAL FIELD

The embodiments described below relate to filtering signals and, more particularly, to a band filter for filtering a discrete time series signal.

BACKGROUND

Filtering of signals has broad applications in many fields of science and engineering. Signal processing filters can be generally classified as high-pass, low-pass, band-pass and band-stop. These filters in general can be implemented as infinite impulse response (IIR) or finite impulse response (FIR) filters however there are other techniques such as regression filtering and frequency domain filtering. Due to the desirable characteristics of FIR filters, they are frequently employed. In order to achieve the desired filter characteristics, such as a sharp transition from the pass band to the stop band, long length FIR filters may be required. However, many times, it is desired to filter a short finite duration digital signal. This can cause implementation issues at the beginning and ending of the signal to be filtered such as bias errors. This issue is sometimes referred to as filter warmup. This also affects IIR filters.

Another technique used in radar signal processing is frequency domain filtering. The signal to be filtered is transformed to the frequency domain typically using a Discrete Fourier Transform (DFT). In the signal's frequency domain representation, the undesirable frequencies can be "notched" or set to zero thus eliminating those frequencies. In order to apply a frequency domain filter, the time series signal is usually first multiplied by a window function such as the von Hann (sometimes called Hanning), Blackman or Hamming. These windows attenuate the time series signal thereby, in effect, reducing the number of available independent samples in the windowed data. Reduced independent samples causes the estimate variance of the signal variables to increase. The window function also has the effect of broadening the signal's spectrum due to the convolution of the unfiltered signal's frequency spectrum with the frequency spectrum of the window function. This alters some of the characteristics of the signal to be filtered.

Accordingly, there is a need for a band filter for filtering a discrete time series signal. For example, there is a need for a band filter for filtering a discrete time series signal that may have a relatively short and finite duration. There is also a need for a band filter for filtering a discrete time series signal without the use of a window function and/or requiring a filter "warm-up" time.

SUMMARY

A band filter for filtering a discrete time series signal is provided. According to an embodiment, the band filter comprises an input frequency shifter configured to frequency down shift the discrete time series signal to provide a frequency down shifted discrete time series signal, a regression based zero frequency centered band filter communicatively coupled to the input frequency shifter, the regression based zero frequency centered band filter being configured to filter the frequency down shifted discrete time series signal to provide a filtered and frequency down shifted discrete time series signal, and an output frequency shifter communicatively coupled to the regression based zero frequency centered band filter, the output frequency shifter being configured to frequency up shift the filtered and frequency down shifted discrete time series signal.

A method of filtering a discrete time series signal with a band filter is provided. According to an embodiment, the method comprises frequency down shifting the discrete time series signal to provide a frequency down shifted discrete time series signal, using a regression based zero frequency centered band filter to filter the frequency down shifted discrete time series signal to provide a filtered and frequency down shifted discrete time series signal, and frequency up shifting the filtered and frequency down shifted discrete time series signal.

Aspects

According to an aspect, a band filter for filtering a discrete time series signal comprises an input frequency shifter configured to frequency down shift the discrete time series signal to provide a frequency down shifted discrete time series signal, a regression based zero frequency centered band filter communicatively coupled to the input frequency shifter, the regression based zero frequency centered band filter being configured to filter the frequency down shifted discrete time series signal to provide a filtered and frequency down shifted discrete time series signal, and an output frequency shifter communicatively coupled to the regression based zero frequency centered band filter, the output frequency shifter being configured to frequency up shift the filtered and frequency down shifted discrete time series signal.

Preferably, the input frequency shifter being configured to frequency down shift the discrete time series signal comprises the input frequency shifter being configured to multiply the discrete time series signal by an exponent of a negatived frequency shift term $k_0$.

Preferably, the output frequency shifter being configured to frequency up shift the filtered and frequency down shifted discrete time series signal comprises the output frequency shifter being configured to multiply the filtered and frequency down shifted discrete time series signal by an exponent of the frequency shift term $k_0$.

Preferably, the regression based zero frequency centered band filter comprises a polynomial regression smoothing filter.

Preferably, the regression based zero frequency centered band filter comprises a polynomial regression filter communicatively coupled to the input frequency shifter, the polynomial regression filter being configured to receive the frequency down shifted discrete time series signal provided by the input frequency shifter, and smooth the frequency down shifted discrete time series signal to provide a smoothed frequency down shifted discrete time series signal.

Preferably, the regression based zero frequency centered band filter further comprises a feed forward loop communicatively coupled to the input frequency shifter, the feed forward loop being configured to receive the frequency down shifted discrete time series signal provided by the input frequency shifter and a summation communicatively coupled to the polynomial regression filter and the feed forward loop, the summation being configured to receive the smoothed frequency down shifted time series signal from the polynomial regression filter, receive the frequency down shifted time series signal from the feed forward loop, and sum the smoothed frequency down shifted discrete time series signal and the frequency down shifted discrete time series signal to provide a filtered and frequency down shifted discrete time series signal.

Preferably, the input frequency shifter is further configured to receive the discrete time series signal, the regression based zero frequency centered band filter is further configured to receive the frequency down shifted discrete time series signal, and the output frequency shifter is further configured to receive the filtered and frequency down shifted discrete time series signal.

According to an aspect, a method of filtering a discrete time series signal with a band filter comprises frequency down shifting the discrete time series signal to provide a frequency down shifted discrete time series signal, using a regression based zero frequency centered band filter to filter the frequency down shifted discrete time series signal to provide a filtered and frequency down shifted discrete time series signal, and frequency up shifting the filtered and frequency down shifted discrete time series signal.

Preferably, frequency down shifting the discrete time series signal comprises multiplying the discrete time series signal by an exponent of a negatived frequency shift term $k_0$.

Preferably, frequency up shifting the filtered and frequency down shifted discrete time series signal comprises multiplying the filtered and frequency down shifted discrete time series signal by an exponent of the frequency shift term $k_0$.

Preferably, the regression based zero frequency centered band filter comprises a polynomial regression smoothing filter.

Preferably, using the regression based zero frequency centered band filter to filter the frequency down shifted discrete time series signal to provide a filtered and frequency down shifted discrete time series signal comprises using a polynomial regression filter to smooth the frequency down shifted discrete time series signal.

Preferably, using the regression based zero frequency centered band filter to filter the frequency down shifted discrete time series signal to provide a filtered and frequency down shifted discrete time series signal further comprises using a summation to sum the smoothed and frequency down shifted discrete time series signal and the frequency down shifted discrete time series signal.

Preferably, the method further comprises receiving with a feed forward loop the frequency down shifted discrete time series signal, receiving with a summation the smoothed frequency down shifted time series signal from the polynomial regression filter, receiving with the summation the frequency down shifted time series signal from the feed forward loop, and summing with the summation the smoothed frequency down shifted discrete time series signal and the frequency down shifted discrete time series signal to provide a filtered and frequency down shifted discrete time series signal.

Preferably, the method further comprises receiving the discrete time series signal with the input frequency shifter, receiving the frequency down shifted discrete time series signal with the regression based zero frequency centered band filter, and receiving the filtered and frequency down shifted discrete time series signal with the output frequency shifter.

BRIEF DESCRIPTION OF THE DRAWINGS

The same reference number represents the same element on all drawings. It should be understood that the drawings are not necessarily to scale.

FIGS. 4 through 7 show a first through fourth frequency spectrums 400-700 illustrating a filtering of one of two distinct signals to demonstrate an application of the band filter 200 described with reference to FIG. 2 for filtering a discrete time series signal.

FIGS. 8 through 13 illustrates an application of the band filter 200 to SZ(8/64) phase coding.

DETAILED DESCRIPTION

FIGS. 1-14 and the following description depict specific examples to teach those skilled in the art how to make and use the best mode of embodiments of filtering a discrete time series signal. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of filtering a discrete time series signal. As a result, the embodiments described below are not limited to the specific examples described below, but only by the claims and their equivalents.

Figure 1:
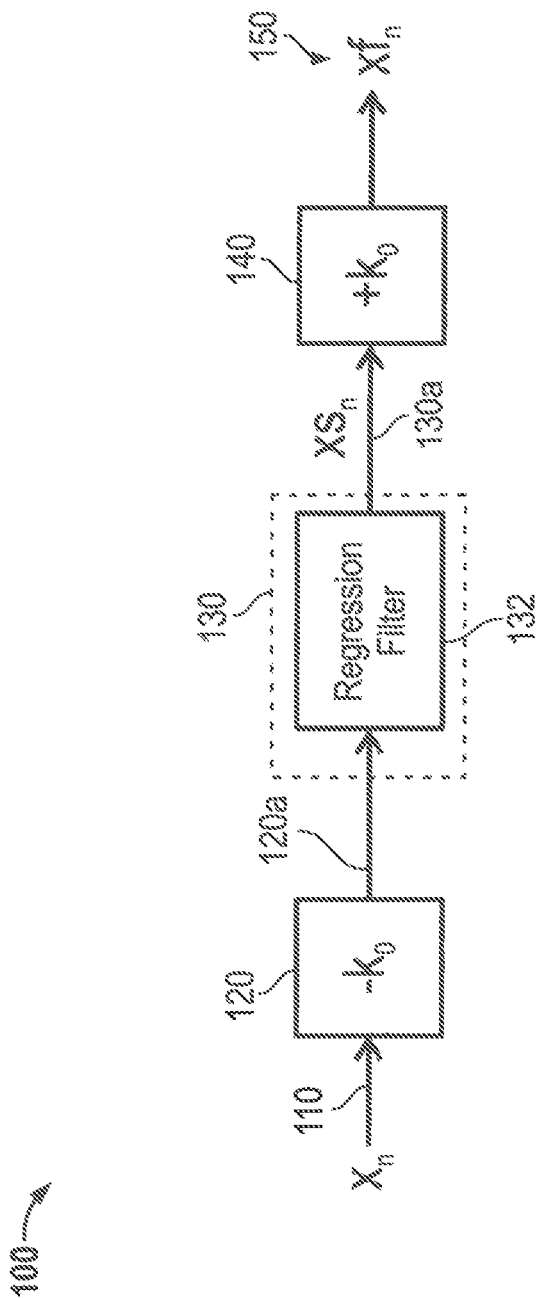
FIG. 1 shows a band filter 100 for filtering a discrete time series signal 110.

A technique other than FIR and IIR filtering is regression filtering where typically a polynomial is fitted to the time series signal to be filtered. In the case of a polynomial regression-based filter, the polynomial fit can be used to estimate the trend of the time series data or the polynomial fit can be subtracted from the data thus yielding the high frequency content of the signal. This high frequency content is typically called the residuals of the signal. Similar results may be obtained with other regression-based filters. As will be explained below, a regression-based filter, such as a regression based zero frequency centered band filter discussed in the following, may not require the use of a window function. The polynomial regression-based filter may also operate on the entire length of the times series and does not have the issue of filter warmup as do the FIR and IIR filters Frequency Band-Pass Filter FIG. 1 shows a band filter 100 for filtering a discrete time series signal 110. As shown in FIG. 1, a discrete time series signal 110 is provided to an input frequency shifter 120. The input frequency shifter 120 is communicatively coupled to any device that may provide the discrete time series signal 110. The input frequency shifter 120 is also communicatively coupled to a regression based zero frequency centered band filter 130. As shown in FIG. 1, an input of the input frequency shifter 120 is communicatively coupled to an output of a device (not shown) configured to provide the discrete time series signal 110 and an output of the input frequency shifter 120 is communicatively coupled to an input of the regression based zero frequency centered band filter 130. The regression based zero frequency centered band filter 130 is communicatively coupled to the input frequency shifter 120 and an output frequency shifter 140. As shown in FIG. 1 the regression based zero frequency centered band filter 130 includes an input and an output, where the input of the regression based zero frequency centered band filter 130 is communicatively coupled to the output of the input frequency shifter 120 and an output of the regression based zero frequency centered band filter 130 is communicatively coupled to an input of the output frequency shifter 140.

The input frequency shifter 120 may be configured to receive the discrete time series signal 110, perform a frequency down shift of the discrete time series signal 110 to obtain a frequency down shifted discrete time series signal 120a, and provide the frequency down shifted discrete time series signal 120a at the output of the input frequency shifter 120. The input frequency shifter 120 may be configured to provide the frequency down shifted discrete time series signal 120a to the regression based zero frequency centered band filter 130. The regression based zero frequency centered band filter 130 may be configured to receive and filter the frequency down shifted discrete time series signal 120a and provide the filtered and frequency downshifted discrete time series signal 130a at the output of the regression based zero frequency centered band filter 130. The output frequency shifter 140 may be configured to receive the filtered and frequency downshifted discrete time series signal 130a from the regression based zero frequency centered band filter 130, perform a frequency up shift of the filtered and frequency downshifted discrete time series signal 130a to obtain a filtered discrete time series signal 150, and provide the filtered discrete time series signal 150 at the output of the output frequency shifter 140.

The discrete time series signal 110 may be any suitable discrete time series signal. For example, the discrete time series signal 110 may be a series of samples of an analog waveform. The sampling may occur at a constant sampling frequency, although any suitable sampling rate or rates may be employed. For example, some applications may preferably employ a variable sampling rate. The discrete time series signal 110 may represent values in any suitable form. For example, the discrete time series signal 110 may be a series of values indexed by sample number. In an example, the discrete time series signal 110 may be a series of decimal values where each value is indexed from 0 to N, where N+1 is a length of the discrete time series signal 110. The discrete time series signal 110 may be provided from storage, in real-time from a sampling device, and/or the like. For example, the discrete time series signal 110 may be obtained from a buffer coupled to a communications interface that receives a digitization of an analog signal.

The input frequency shifter 120 may be any suitable frequency shifter configured to frequency down shift a discrete time series signal. For example, the input frequency shifter 120 may be configured to receive any suitable discrete time series signal, such as a narrow or broadband signal, a multi-component signal, a plurality of signals, including the narrow or broadband signal and/or multi-component signal, products of the plurality of signals, and/or the like. The input frequency shifter 120 may shift a frequency of the received discrete time series signal down by a frequency shift value of, for example, $-k_0$. If the received discrete time series signal is a multi-component signal, then components of the multi-component signal may be frequency down shifted by the frequency down shift amount $-k_0$.

The input frequency shifter 120 may multiply the discrete time series signal 110 by an exponential scaled value of the frequency shift value $-k_0$ to obtain the frequency down shifted discrete time series signal 120a. For example, the frequency down shifted discrete time series signal 120a may be comprised of all the component discrete time series signals of the frequency down shifted discrete time series signal 120a that are frequency down shifted by $-k_0$. The frequency down shifted discrete time series signal 120a may be received by the regression based zero frequency centered band filter 130, although any suitable regression based zero frequency centered band filter may be employed.

As shown in FIG. 1, the regression based zero frequency centered band filter 130 is comprised of a regression filter 132 that is communicatively coupled to the input frequency shifter 120. The regression filter 132 may be a polynomial regression filter, although any suitable regression filter may be employed such as, for example, Gaussian. Lorentzian, Voigt functions, or other similar or dissimilar functions. For example, in some applications, an inverted logistic sigmoid function (e.g., S-curve) may be used. The regression filter 132 may be configured to smooth the frequency down shifted discrete time series signal 120a into a filtered and frequency downshifted discrete time series signal 130a and provide the filtered and frequency downshifted discrete time series signal 130a. The regression filter 132 may be configured to pass any low frequency components of the frequency down shifted discrete time series signal 120a received from the input frequency shifter 120. For example, component discrete time series signals of the frequency down shifted discrete time series signal 120a that have frequencies that are within cutoff frequencies of the regression filter 132 may be passed. Accordingly, the regression based zero frequency centered band filter 130 may be any suitable regression based zero frequency centered band filter. The regression based zero frequency centered band filter 130 may be configured to significantly attenuate lower frequency components from the frequency down shifted discrete time series signal 120a. Accordingly, the regression based zero frequency centered band filter 130 may be configured to pass higher frequency components from the frequency down shifted discrete time series signal 120a. With more particularity, the regression based zero frequency centered band filter 130 may have pass band outside of which signals are significantly attenuated to obtain the filtered and frequency downshifted discrete time series signal 130a. Components having frequencies within the pass band of the regression based zero frequency centered band filter 130 may not be attenuated to obtain the filtered and frequency downshifted discrete time series signal 130a.

Accordingly, the filtered and frequency downshifted discrete time series signal 130a may be any suitable frequency down shifted and filtered discrete time series signal. For example, as shown in FIG. 1, the filtered and frequency downshifted discrete time series signal 130a may be comprised of components of the discrete time series signal 110 that, after being frequency down shifted by the input frequency shifter 120, have frequencies that are within the pass band of the regression filter 132. The filtered and frequency downshifted discrete time series signal 130a may be provided to the output frequency shifter 140. The filtered and frequency downshifted discrete time series signal 130a may be received by the output frequency shifter 140 without any additional processing, although additional intervening devices may be employed in alternative embodiments.

The output frequency shifter 140 may be any suitable frequency up shifter. The output frequency shifter 140 may be configured to receive any suitable filtered and frequency downshifted discrete time series signal 130a, such as a narrow or broadband signal, a multi-component signal, a plurality of signals, including the narrow or broadband signal and/or multi-component signal, products of the plurality of signals, and/or the like. The input frequency shifter 120 may shift a frequency or frequencies of the received filtered and frequency downshifted discrete time series signal 130a up by a frequency shift value of, for example, $k_0$. For example, if the received filtered and frequency downshifted discrete time series signal 130a signal is a multi-component signal, then components of the multi-component signal may be frequency up shifted by the frequency up shift amount $k_0$. The output frequency shifter 140 may multiply the filtered and frequency downshifted discrete time series signal 130a by an exponential scaled value of the frequency shift value $k_0$ to obtain the filtered discrete time series signal 150. The filtered discrete time series signal 150 or $xf_n$ may be any suitable filtered discrete time series signal. For example, the filtered discrete time series signal 150 may be referred to as a band filtered discrete time series signal or, with more particularity, a band-pass filtered discrete time series signal.

Frequency Band-Stop Filter

Figure 2:
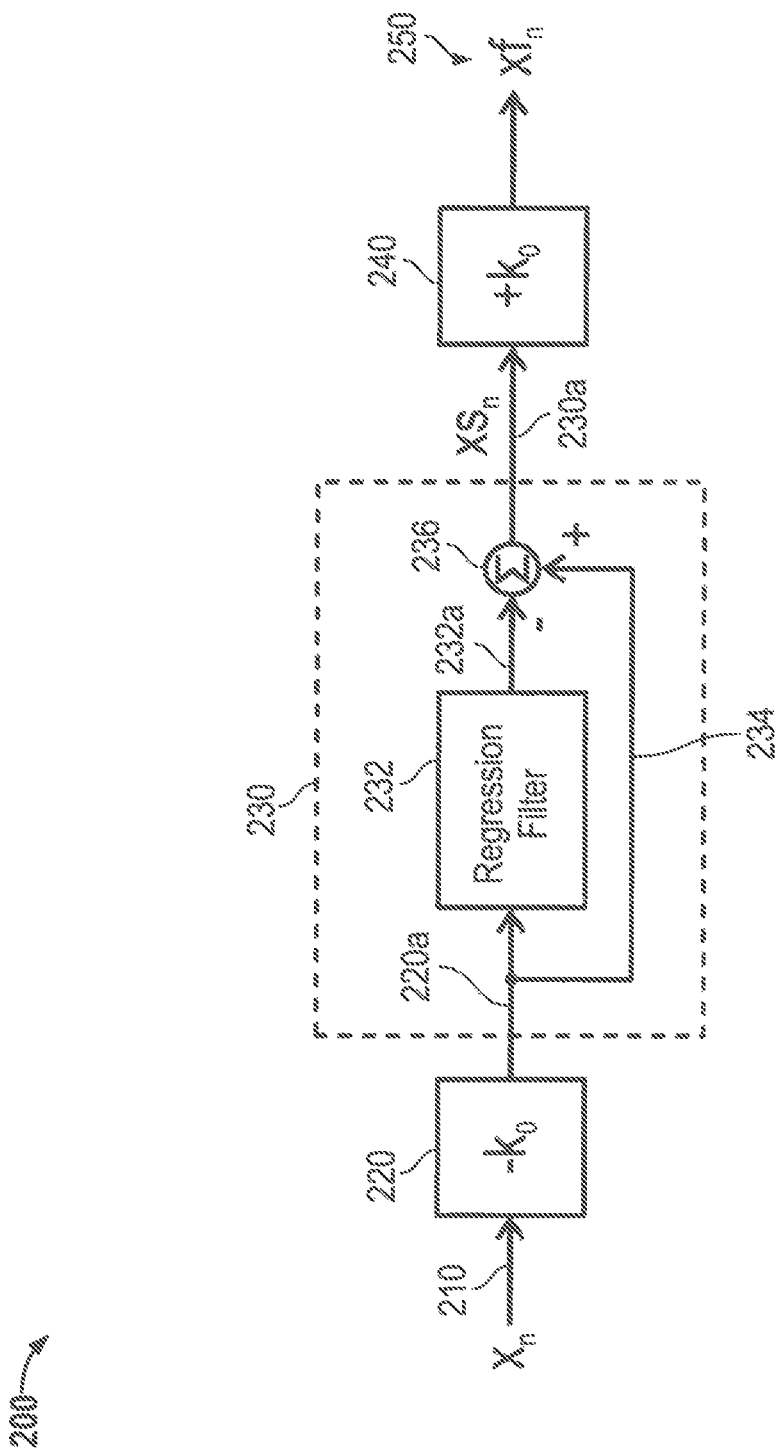
FIG. 2 shows a band filter 200 for filtering a discrete time series signal 210.

FIG. 2 shows a band filter 200 for filtering a discrete time series signal 210. As shown in FIG. 2, the discrete time series signal 210 is provided to an input frequency shifter 220. The input frequency shifter 220 may be communicatively coupled to any device that may provide the discrete time series signal 210. The input frequency shifter 220 is communicatively coupled to a regression based zero frequency centered band filter 230. As shown in FIG. 1, an input of the input frequency shifter 220 is communicatively coupled to an output of a device configured to provide the discrete time series signal 210. An output of the input frequency shifter 220 is communicatively coupled to an input of the regression based zero frequency centered band filter 230. The regression based zero frequency centered band filter 230 is communicatively coupled to the input frequency shifter 220 and an output frequency shifter 240. The regression based zero frequency centered band filter 230 includes an input and an output, where the input of the regression based zero frequency centered band filter 230 is communicatively coupled to the output of the input frequency shifter 220 and an output of the regression based zero frequency centered band filter 230 is communicatively coupled to an input of the output frequency shifter 240. The output frequency shifter 240 includes an input that is communicatively coupled to the output of the regression based zero frequency centered band filter 230.

The input frequency shifter 220 may be configured to receive the discrete time series signal 210, perform a frequency down shift of the discrete time series signal 210 to obtain a frequency down shifted discrete time series signal 220a, and provide the frequency down shifted discrete time series signal 220a at the output of the input frequency shifter 220. The input frequency shifter 220 may be configured to provide the frequency down shifted discrete time series signal 220a to the regression based zero frequency centered band filter 230. The regression based zero frequency centered band filter 230 may be configured to receive the frequency down shifted discrete time series signal 220a, filter the frequency down shifted discrete time series signal 220a, and provide the filtered and frequency downshifted discrete time series signal 230a at the output of the regression based zero frequency centered band filter 230. The output frequency shifter 240 may be configured to receive the filtered and frequency downshifted discrete time series signal 230a from the regression based zero frequency centered band filter 230, perform a frequency up shift of the filtered and frequency downshifted discrete time series signal 230a to obtain and provide a filtered discrete time series signal 250.

For a complex valued discrete time series, a frequency spectrum of a DFT may range from −180 to +180 degrees, or similar, such as π to −π, such that frequency "up" shifting may refer to negative frequencies of the discrete time series signals are frequency down shifted away from zero. As can be appreciated, the input frequency shifters 120, 220 and output frequency shifters 140, 240 may alternatively be referred to as applied frequency shifters in that a frequency shift is being applied to the discrete time series signal 110, 210 by the input frequency shifter 110, 210 or the frequency downshifted discrete time series signal 130a, 230a by the output frequency shifter 140, 240, although any suitable term may be employed.

The discrete time series signal 210 may be any suitable discrete time series signal. For example, the discrete time series signal 210 may be a series of samples of an analog waveform. The sampling may occur at a constant sampling frequency, although any suitable sampling rate or rates may be employed. For example, some applications may preferably employ a variable sampling rate. The discrete time series signal 210 may represent values in any suitable form. For example, the discrete time series signal 210 may be a series of values indexed by sample number. In one example, the discrete time series signal 210 may be a series of decimal values where each value is indexed from 0 to n, where n+1 is a length of the discrete time series signal 210. The discrete time series signal 210 may be provided from storage, in real-time from a sampling device, and/or the like. For example, the discrete time series signal 210 may be obtained from a buffer coupled to a communications interface that receives a digitization of an analog signal.

The input frequency shifter 220 may be any suitable frequency shifter that performs a frequency down shift on a discrete time series signal. For example, the input frequency shifter 220 may be configured to receive any suitable discrete time series signal, such as a narrow or broadband signal, a multi-component signal, a plurality of signals, including the narrow or broadband signal and/or multi-component signal, products of the plurality of signals, and/or the like. The input frequency shifter 220 may shift a frequency or frequencies of the received signal down by a frequency shift value of, for example, $-k_0$. If the received signal is a multi-component signal, then components of the multi-component signal may be frequency down shifted by the frequency down shift amount $-k_0$.

The input frequency shifter 220 may multiply the discrete time series signal 210 by an exponential scaled value of the frequency shift value $-k_0$ to obtain the frequency down shifted discrete time series signal 220a. Accordingly, the frequency down shifted discrete time series signal 220a may be a frequency down shifted discrete time series signal. For example, the frequency down shifted discrete time series signal 220a may be comprised of all the component discrete time series signals of the frequency down shifted discrete time series signal 220a that are frequency down shifted by $-k_0$. The frequency down shifted discrete time series signal 220a may be received by the regression based zero frequency centered band filter 230, although any suitable regression based zero frequency centered band filter may be employed.

As shown in FIG. 2, the regression based zero frequency centered band filter 230 is comprised of a regression filter 232 and a feed forward loop 234 that is communicatively coupled to the input frequency shifter 220. The regression filter 232 and the feed forward loop 234 may be configured to receive the frequency down shifted discrete time series signal 220a. The regression filter 232 may be configured to smooth the frequency down shifted discrete time series signal 220a into a smoothed frequency down shifted discrete time series signal 232a and provide the smoothed frequency down shifted discrete time series signal 232a. The feed forward loop 234 may be configured to provide the frequency down shifted discrete time series signal 220a without filtering or otherwise altering the frequency down shifted discrete time series signal 220a. The regression filter 232 and the feed forward loop 234 may be communicatively coupled to a summation 236. Accordingly, the summation 236 may receive the smoothed frequency down shifted discrete time series signal 232a from the regression filter 232 and the frequency down shifted discrete time series signal 220a from the feed forward loop 234. The summation 236 may be configured to subtract the smoothed frequency down shifted discrete time series signal 232a from the frequency down shifted discrete time series signal 220a to obtain the filtered and frequency downshifted discrete time series signal 230a.

The regression based zero frequency centered band filter 230 may be any suitable regression based zero frequency centered band filter. The regression based zero frequency centered band filter 230 may be configured to attenuate lower frequency components from the frequency down shifted discrete time series signal 220a. Accordingly, the regression based zero frequency centered band filter 230 may be configured to pass higher frequency components from the frequency down shifted discrete time series signal 220a. With more particularity, the regression based zero frequency centered band filter 230 may have stop band outside of which components are passed. Within the stop band, which may be defined by a low frequency cutoff and a high frequency cutoff, components having frequencies within the stop band may be significantly attenuated to obtain the filtered and frequency downshifted discrete time series signal 230a.

The regression filter 232 may be the regression filter 132 described above with reference to FIG. 1, although any suitable regression based smoothing filter may be employed. The regression filter 232 may be configured to smooth the frequency down shifted discrete time series signal 220a into a smoothed frequency down shifted discrete time series signal 232a. The regression filter 232 may be configured to pass components of the frequency down shifted discrete time series signal 220a received from the input frequency shifter 220 that are within a pass band of the regression filter 232. For example, component discrete time series signals of the frequency down shifted discrete time series signal 220a that have frequencies that are within cutoff frequencies of the regression filter 232 may be passed. The pass band of the regression filter 232 may be centered at zero.

The smoothed frequency down shifted discrete time series signal 232a may be any suitable smoothed and frequency down shifted discrete time series signal that is provided by the regression filter 232. For example, the smoothed frequency down shifted discrete time series signal 232a may be comprised of components of the discrete time series signal 210 that have frequencies that, after being frequency down shifted by the discrete time series signal 210, are within the pass band of the regression filter 232.

As discussed above, the frequency down shifted discrete time series signal 220a is also provided to the feed forward loop 234. The feed forward loop 234 may be any suitable path that conveys the frequency down shifted discrete time series signal 220a to the summation 236. As shown in FIG. 2, the feed forward loop 234 is communicatively coupled to an output of the input frequency shifter 220 and an input of the summation 236. Accordingly, the frequency down shifted discrete time series signal 220a may be conveyed, transmitted, conducted, or the like to the summation 236. Although no devices are shown in FIG. 2 as being part of the feed forward loop 234, alternative feed forward loops may include one or more devices.

The summation 236 may be any suitable summation that is configured to sum two discrete time series signals. As shown in FIG. 2, the summation 236 is configured to receive the smoothed frequency down shifted discrete time series signal 232a and the frequency down shifted discrete time series signal 220a. The summation 236a may sum an amplitude of the smoothed frequency down shifted discrete time series signal 232a with an amplitude of the frequency down shifted discrete time series signal 220a at a given time index, although any suitable summation may be employed. The summation 236a sums the smoothed frequency down shifted discrete time series signal 232a and the frequency down shifted discrete time series signal 220a to provide the filtered and frequency downshifted discrete time series signal 230a. The filtered and frequency downshifted discrete time series signal 230a may be any suitable filtered and frequency down shifted discrete time series signal provided by the regression based zero frequency centered band filter 230.

The output frequency shifter 240 may be any suitable frequency up shifter. The output frequency shifter 240 may be configured to receive any suitable filtered and frequency downshifted discrete time series signal 230a, such as a narrow or broadband signal, a multi-component signal, a plurality of signals, including the narrow or broadband signal and/or multi-component signal, products of the plurality of signals, and/or the like. The input frequency shifter 220 may shift a frequency or frequencies of the received filtered and frequency downshifted discrete time series signal 230a up by a frequency shift value of, for example, $k_0$. For example, if the filtered and frequency downshifted discrete time series signal 230a signal is a multi-component signal, then components of the multi-component signal may be frequency up shifted by the frequency up shift amount $k_0$. The output frequency shifter 140 may multiply the filtered and frequency downshifted discrete time series signal 230a by an exponential scaled value of the frequency shift value $k_0$ to obtain the filtered discrete time series signal 250. The filtered discrete time series signal 250 or $xf_n$ may be any suitable filtered discrete time series signal. For example, the filtered discrete time series signal 250 may be referred to as a band filtered discrete time series signal or, with more particularity, a band-stop filtered discrete time series signal. The filtered discrete time series signal 250 or $xf_n$ may be a filtered discrete time series signal. For example, the filtered discrete time series signal 250 may be referred to as band filtered discrete time series signal or, with more particularity, a band-stop filtered discrete time series signal.

The band filters 100, 200 may be referred to or described as a regression frequency shift filter (RFSF), although any suitable descriptive term may be employed. As will be described in more detail below with reference to FIGS. 3-7, the band filter 200 described with reference to FIG. 2 may separate two signals by attenuating one of the two signals. Accordingly, the band filter 200 may be used filter out or attenuate a frequency component of a discrete time series signal, as is described in more detail in the following.

The discrete time series signal 210 may be frequency shifted by a frequency shift value of, for example, $-k_0$ by the input frequency shifter 220 so that a selected center frequency of component discrete time series signal in the discrete time series signal 210 is in a zero frequency location of the regression filter 232. This may be accomplished with the well-known general Fourier frequency shift transform pair property, $$x(t)e^{(j\omega_0 t)} \Leftrightarrow X(\omega - \omega_0), \qquad [1]$$

where x(t) is the time series signal X(ω) is the Fourier transform of x(t), ω is frequency, to is the frequency shift, j is the square root of −1, and t is time. For a discrete time series signal, such as, for example, the discrete time series signal 210 described above, equation [1] can be equivalent expressed, $$\mathcal{F}\left\{x_n e\left(\frac{j2\pi n k_0}{N}\right)\right\} = X_{k-k_0}, \qquad [2]$$

where $\mathcal{F}$ indicates a Fourier transform, n is the time index, k is the frequency index, $k_0$ is the integer frequency shift parameter, and N is the length of the discrete time series signal.

An algorithm for band-stop filtering, such as the band filter 200 described above, at an arbitrary frequency may be as follows: 1. select the center frequency, $k_0$, for the regression filter, 2. frequency shift the time series signal according to Equation [2](using $-k_0$), 3. apply a regression filter to the frequency shifted signal, $$x_n e\left(\frac{j2\pi n k_0}{N}\right).$$

Frequency shift the filtered signal back to the original frequency locations using $$xf_n = xs_n e\left(\frac{j2\pi k_0}{N}\right),$$

where $xs_n$ is the frequency shifted and filtered time series and $xf_n$ is a final band-stop filtered discrete time series signal, such as, for example, the filtered discrete time series signal 250. The regression filter stop-band bandwidth may, for polynomial regression filters, a function of the time series length and the polynomial order. The stop bandwidth can be chosen from the regression filter's frequency response plot, as will be described in more detail in the following with reference to FIGS. 3-7.

Figure 3:
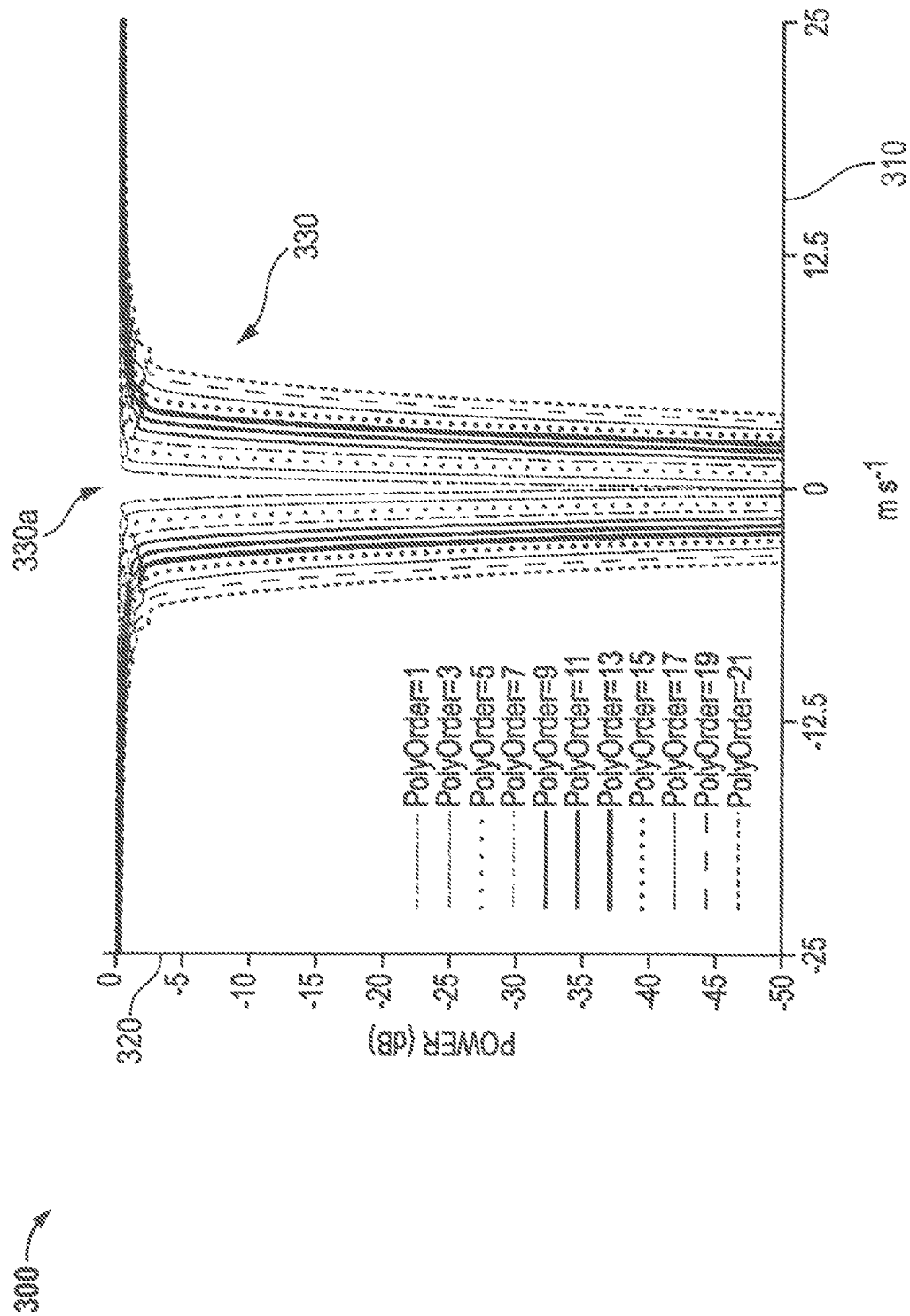
FIG. 3 shows a frequency response graph 300 of a polynomial regression filter.

FIG. 3 shows a frequency response graph 300 of a regression filter. As shown in FIG. 3, the frequency response graph 300 includes a frequency axis 310 and a power axis 320. The frequency axis 310 ranges from −25 to 25 m s$^{-1}$ (i.e., a frequency index of 'm', which may be at a sampling rate of, for example, Ts=0.001 s) which can correspond to +/−180 degrees, and the power axis 320 ranges from −50 to 0 dB, although any suitable ranges may be employed. For example, other frequency response graphs may include a frequency axis that range from +/−π radians, or other similar ranges. The frequency response graph 300 also includes a plurality of frequency response plots 330. Each of the frequency response plots 330 is a frequency response of a polynomial regression filter having a particular order.

As shown in FIG. 3, the frequency response plots 330 are for a polynomial regression filter for 64 data points for odd-numbered polynomial orders 1 through 21. As can be seen, the frequency response plots 330 include stop bands 330a, which are centered as zero frequency. The higher the order of the polynomial, the wider a bandwidth of a given stop band of the stop bands 330a in the regression filter.

FIGS. 4 through 7 show a first through fourth frequency spectrums 400-700 illustrating a filtering of one of two distinct signals to demonstrate an application of the band filter 200 described with reference to FIG. 2 for filtering a discrete time series signal. As shown in FIGS. 4-7, the first through fourth frequency spectrums 400-700 have a discrete bandwidth of 64 data points, although any suitable bandwidth may be employed. Accordingly, as shown in FIGS. 4-7, the first through fourth frequency spectrums include a frequency axis 410 and a power axis 420. The first through fourth frequency spectrums 400-700 illustrate a dual signal frequency spectrum 430, a frequency shifted dual signal frequency spectrum 530, a filtered frequency shifted dual signal frequency spectrum 630, and a filtered dual signal frequency spectrum 730.

In the example shown in FIGS. 4-7, two signals with separate distinct frequency spectra are separated via the band filter 100 as an illustration of the technique. The power spectrum is shown in FIG. 4. The wider spectrum width signal, centered at about frequency index 52, is now shifted to zero velocity via Eq. [2]. The resulting frequency sifted signal is shown in FIG. 5. Now that the desired signal is centered at zero frequency, a regression filter is applied to eliminate the power at those frequencies around zero. This is shown in FIG. 6. Finally, the data in FIG. 6 are frequency shifted back to their original frequency locations. This is shown in FIG. 7. Thus, band-stop filtering has been accomplished without the use of finite impulse response (FIR) or infinite impulse response (IIR) techniques and without using a time domain window function.

As shown in FIG. 4, the dual signal frequency spectrum 430 includes the two distinct signals, which are referenced as a first signal 430a and a second signal 430b. The first signal 430a has a bandwidth that is narrower than a bandwidth of the second signal 430b. The bandwidth of the first signal 430a is centered at about the frequency index of '0' and the bandwidth of the second signal 430b is centered at about the frequency index of '52', although any suitable number of signals and/or values of center frequencies of signal bandwidths may be employed.

As shown in FIG. 5, the frequency shifted dual signal frequency spectrum 530 includes a frequency shifted first signal 530a and a frequency shifted second signal 530b that respectively correspond to the first and second signal 430a, 430b of FIG. 4. As can be appreciated, the frequency shifted dual signal frequency spectrum 530 is a frequency shifted version of the dual signal frequency spectrum 430 shown in FIG. 4.

As shown in FIG. 6, the filtered frequency shifted dual signal frequency spectrum 630 includes a frequency shifted first signal 630a that is essentially the same as the frequency shifted first signal 530a of FIG. 5. However, the filtered frequency shifted dual signal frequency spectrum 630 includes an attenuated frequency shifted second signal 630b that results from attenuating the frequency shifted second signal 530b of FIG. 5. More specifically, the attenuated frequency shifted second signal 630b of the frequency shifted dual signal frequency spectrum 530 may result from an attenuation of the frequency shifted second signal 530b by the band filter 200 described above with reference to FIG. 2.

As shown in FIG. 7, the filtered dual signal frequency spectrum 730 includes a first signal 730a that corresponds to the first signal 430a shown in FIG. 4 and an attenuated second signal 630b that may result from frequency shifting the attenuated frequency shifted second signal 630b shown in FIG. 6. More specifically, the filtered dual signal frequency spectrum 730 may result from frequency up shifting the filtered frequency shifted dual signal frequency spectrum 630 by a shift frequency, which may be the same as the shift frequency used to frequency down shift the dual signal frequency spectrum 430.

Summarizing, the dual signal frequency spectrum 430 may be down shifted by a frequency shift value of $-k_0$ to obtain the frequency shifted dual signal frequency spectrum 530 shown in FIG. 5. As discussed above, the frequency shifted dual signal frequency spectrum 530 may be filtered by the band filter 200 to obtain the filtered frequency shifted dual signal frequency spectrum 630 shown in FIG. 6. The filtered frequency shifted dual signal frequency spectrum 630 show in FIG. 6 may be frequency up shifted by the same amount to obtain the filtered dual signal frequency spectrum 730. For example, the filtered frequency shifted dual signal frequency spectrum 630 may be up shifted by a frequency shift value of $+k_0$ to obtain the filtered dual signal frequency spectrum 730.

FIGS. 8 through 13 illustrates an application of the band filter 200 to SZ(8/64) phase coding. The SZ(8/64) phase coding is a technique to mitigate range-velocity ambiguities in the nation's NEXRAD weather radar data (Sachidananda and Zrnic, 1999). SZ phase coding provides for the separation of multiple trip overlaid weather echoes. This is accomplished by applying a phase code to the individual radar transmit pulses. Upon reception of the return signal, the first trip echo will be coded with one set of phases while the second trip echo is phase coded with a different set of phases. Assuming that the first trip echo is the strongest echo, the first trip echo is made coherent by cohering the signal using the conjugate of the known transmit phases. At this point, the second trip echo (the weak trip) possesses phases that are termed the modulation code that distributes the weak trip echo across the entire frequency range making the second trip echo behave like white noise.

Prior the development of the band filter 200 discussed above, to separate the strong trip (ST) and weak trip (WT) echoes, first a window function is applied to the ST cohered time series. The spectrum of the signal is calculated and the center velocity of the ST is found. Usually, a ¾ spectrum width notch is applied centered at the ST calculated velocity. At this point the ST trip signal has been eliminated. The spectrum is then transformed back to the time domain where the WT is recohered using the conjugate of the modulation code. The WT signal power and velocity can then be estimated, but with some measurement error.

The band filter 200 described above may now be used to eliminate the ST echo illustrated via an example. The time series window function will not be required so that the WT power and velocity can be recovered with reduced measurement error, as will be described in the following with reference to FIGS. 8-13. FIGS. 8-13 show SZ phase coding graphs 800-1300 that include a frequency index axis 810-1310 and a magnitude axis 820-1320. The SZ phase coding graphs 800-1300 are shown as including frequency spectrums. As shown in FIG. 8, the SZ phase coding graph 800 shows an ST signal frequency spectrum 830. The SZ phase coding graph 900 of FIG. 9 shows a WT signal frequency spectrum 930. Also shown in FIGS. 8 and 9 is a zero or "0" velocity line. The zero-velocity line is at a frequency index of about 33.

As shown in FIG. 8, the ST signal frequency spectrum 830 is a frequency spectrum of an ST signal. As can be appreciated from the ST signal frequency spectrum 830, the ST signal may have a center frequency that is at a frequency index of about 38. As shown in FIG. 9, the WT signal frequency spectrum 930 is a frequency spectrum of a WT signal. The WT signal frequency spectrum 930 is centered at a frequency index of about 38.

Figures 10, 11:
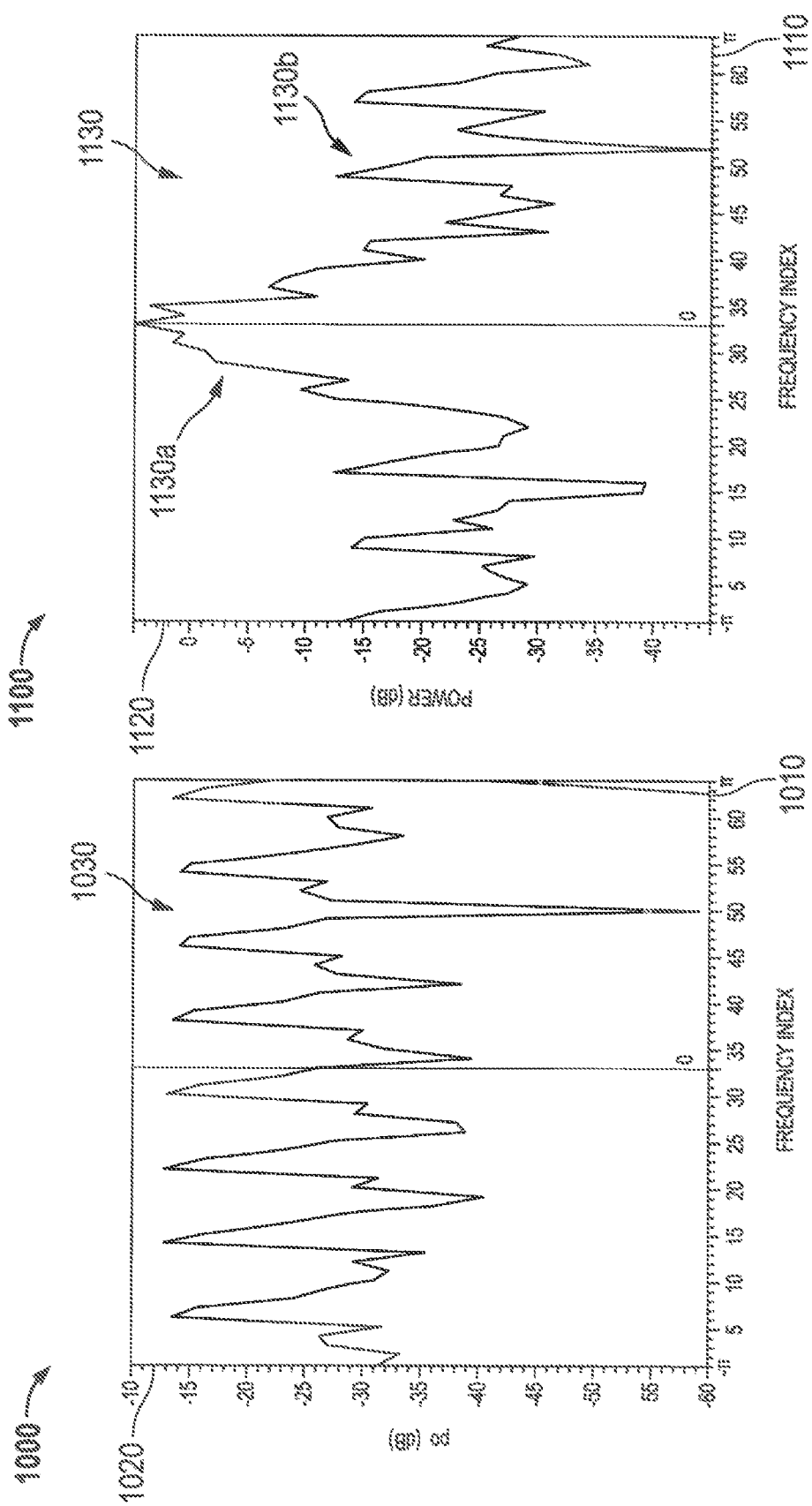

In FIG. 10, the SZ phase coding graph 1000 illustrates a modulated WT signal frequency spectrum 1030. More specifically, the modulated WT signal frequency spectrum 1030 is a spectrum of a WT signal after the SZ (8/64) modulation code is applied. Due to the SZ (8/64) modulation code being applied, eight replicas of the WT signal frequency spectrum 930 are produced resulting in the modulated WT signal frequency spectrum 1030. As can be seen in FIG. 10, the eight replicas are distributed equally across the frequency spectrum in the modulated WT signal frequency spectrum 1030.

In FIG. 11, the SZ phase coding graph 1100 includes a combined ST/WT signal frequency spectrum 1130. More specifically, the ST signal illustrated in FIG. 8 as the ST signal frequency spectrum 830 is combined with the modulated WT signal frequency spectrum 1030 by adding point-by-point in the time domain the ST signal and the modulated WT signal and frequency shifting the resulting signal to be centered as zero velocity (illustrated by the "0" line). More specifically, for a given time-index, a magnitude value of the ST signal is added with a magnitude value of the modulated WT signal and the resulting signal is frequency shifted to be about the "0" velocity line. As a result, the combined ST/WT signal frequency spectrum 1130 includes a ST signal frequency spectrum portion 1130a and a modulated WT signal spectrum portion 1130b.

In FIG. 12, the SZ phase coding graph 1200 shows a filtered ST/WT signal frequency spectrum 1230. The filtered ST/WT signal frequency spectrum 1230 includes an attenuated portion 1230a. As can be seen, the attenuated portion 1230a has a magnitude of less than −100 dB magnitude whereas the remainder of the filtered ST/WT signal frequency spectrum 1230 has a magnitude of approximate −10 dB. The filtered ST/WT signal frequency spectrum 1230 may be obtained by filtering the combined ST/WT signal with the band filter 200 described above and frequency shifting the resulting signal to the center frequency of the ST signal as shown in FIG. 8. As a result, a center frequency of the stop band is centered at a frequency index of about 38.

FIG. 13 shows a recombined ST/WT signal frequency spectrum 1330. As shown in FIG. 13, the recombined ST/WT signal frequency spectrum 1330 includes a ST signal frequency spectrum portion 1330a and a WT signal frequency spectrum portion 1330b. The recombined ST/WT signal frequency spectrum 1330 can be used to effectively estimate a power and a velocity of the WT signal without the use of a window function. As a result, the power and velocity are recovered with smaller measurement error when compared to the measurement error associated with the use of a Hanning window.

Figure 14:
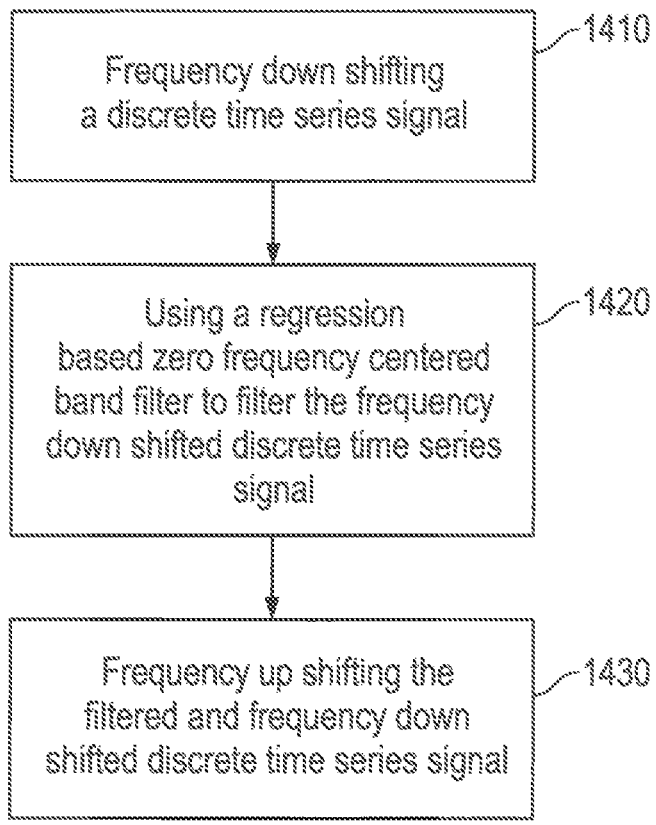
FIG. 14 shows a method 1400 of filtering a discrete time series signal with a band filter.

FIG. 14 shows a method 1400 of filtering a discrete time series signal with a band filter. In step 1410, the method 1400 may frequency down shift a discrete time series signal. In step 1420, the method 1400 may use a regression based zero frequency centered band filter to filter the frequency down shifted discrete time series signal. The method 1400, in step 1430, may frequency up shift the filtered and frequency down shifted discrete time series signal.

The discrete time series signal to be down shifted may be the discrete time series signal 110, 210 described above, although any suitable discrete time series signal may be employed. The discrete time series signal may be down shifted by, for example, the input frequency shifters 120, 220 described above, although any suitable input frequency shifter may be employed. The step 1410 may frequency down shift the discrete time series signal to provide a frequency down shifted discrete time series signal.

In step 1420, the frequency down shifted signal may be filtered by using a regression based zero frequency centered band filter to filter the frequency down shifted discrete time series signal to provide a filtered and frequency down shifted discrete time series signal. The regression based zero frequency centered band filter may be the regression based zero frequency centered band filters 130, 230 described above, although any suitable regression based zero frequency centered band filter may be employed.

As discussed above with reference to FIG. 1, the regression based zero frequency centered band filter 130 may be comprised of a regression filter 132 that is a time domain filter that passes a discrete time series signal within two cutoff frequencies. As discussed above with reference to FIG. 2, the regression based zero frequency centered band filter 230 may be comprised of a regression filter 232 similar to the regression filter 132 of FIG. 1 and a feed forward loop 234 that is communicatively coupled to the input frequency shifter 220.

Referring again to FIG. 14, the step 1430 may frequency up shift the filtered and frequency down shifted discrete time series signal to provide a filtered discrete time series signal. The filtered discrete time series signal obtained from step 1430 may be the filtered discrete time series signals 150, 250 described above, although any suitable filtered discrete time series signal may be employed.

Frequency down shifting the discrete time series signal may comprise multiplying the discrete time series signal by an exponent of a negatived frequency shift term $k_0$ and wherein frequency up shifting the filtered and frequency down shifted discrete time series signal comprises multiplying the filtered and frequency down shifted discrete time series signal by an exponent of the frequency shift term $k_0$.

The regression based zero frequency centered band filter comprises a polynomial regression smoothing filter. The regression based zero frequency centered band filter to filter the frequency down shifted discrete time series signal to provide a filtered and frequency down shifted discrete time series signal may comprise using a polynomial regression filter to smooth the frequency down shifted discrete time series signal and using a summation to sum the smoothed and frequency down shifted discrete time series signal and the frequency down shifted discrete time series signal.

The band filters 100, 200 and method 1400 may filter a discrete time series signal. In particular, the band filters 100, 200 and the method 1400 employ a regression based zero frequency centered band filter 130, 230 to ensure that filtering discrete time series signal with relatively short and finite duration and without the use of a window function and/or requiring a filter "warm-up" time. More specifically, the regression based zero frequency centered band filter 130, 230 both employ the regression filter 132, 232 that passes low frequency components of a frequency down shifted discrete time series signal. Accordingly, the benefits of discussed above may be realized.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined, in whole or in part, to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other band filters for filtering a discrete time series signal and not just to the embodiments described above and shown in the accompanying figures. Accordingly, the scope of the embodiments described above should be determined from the following claims.

I claim:

1. A band filter (100, 200) for filtering a discrete time series signal (110, 210), the band filter (100, 200) comprising:
   an input frequency shifter (120, 220) configured to frequency down shift the discrete time series signal (110, 210) to provide a frequency down shifted discrete time series signal (120a, 220a);
   a high-pass higher order polynomial regression based zero frequency centered band filter (130, 230) communicatively coupled to the input frequency shifter (120, 220), the high-pass higher order polynomial regression based zero frequency centered band filter (130, 230) being configured to:
      operate on an entire length of the frequency down shifted discrete time series signal (120a, 220a); and
      filter the frequency down shifted discrete time series signal (120a, 220a) to provide a filtered and frequency down shifted discrete time series signal (130a, 230a); and
   an output frequency shifter (140, 240) communicatively coupled to the high-pass higher order polynomial regression based zero frequency centered band filter (130, 230), the output frequency shifter (140, 240) being configured to frequency up shift the filtered and frequency down shifted discrete time series signal (130a, 230a).

2. The band filter (100, 200) of claim 1, wherein:
   the input frequency shifter (120, 220) being configured to frequency down shift the discrete time series signal (110, 210) comprises the input frequency shifter (120, 220) being configured to multiply the discrete time series signal (110, 210) by an exponent of a negatived frequency shift term $k_0$.

3. The band filter (100, 200) of claim 1, wherein:
   the output frequency shifter (140, 240) being configured to frequency up shift the filtered and frequency down shifted discrete time series signal (130a, 230a) comprises the output frequency shifter (140, 240) being configured to multiply the filtered and frequency down shifted discrete time series signal (130a, 230a) by an exponent of the frequency shift term $k_0$.

4. The band filter (100) of claim 1, wherein the high-pass higher order polynomial regression based zero frequency centered band filter (130) comprises a polynomial regression smoothing filter.

5. The band filter (200) of claim 1, wherein the high-pass higher order polynomial regression based zero frequency centered band filter (230) comprises:
a polynomial regression filter (232) communicatively coupled to the input frequency shifter (220), the polynomial regression filter (232) being configured to:
receive the frequency down shifted discrete time series signal (220a) provided by the input frequency shifter (220); and
smooth the frequency down shifted discrete time series signal (220a) to provide a smoothed frequency down shifted discrete time series signal (232a).

6. The band filter (200) of claim 5, wherein the high-pass higher order polynomial regression based zero frequency centered band filter (230) further comprises:
a feed forward loop (234) communicatively coupled to the input frequency shifter (220), the feed forward loop (234) being configured to receive the frequency down shifted discrete time series signal (220a) provided by the input frequency shifter (220); and
a summation (236) communicatively coupled to the polynomial regression filter (232) and the feed forward loop (234), the summation (236) being configured to:
receive the smoothed frequency down shifted time series signal (232a) from the polynomial regression filter (232);
receive the frequency down shifted time series signal (220a) from the feed forward loop (234); and
sum the smoothed frequency down shifted discrete time series signal (232a) and the frequency down shifted discrete time series signal (220a) to provide a filtered and frequency down shifted discrete time series signal (230a).

7. The band filter (100, 200) of claim 1, wherein:
the input frequency shifter (120, 220) is further configured to receive the discrete time series signal (110, 210);
the high-pass higher order polynomial regression based zero frequency centered band filter (130, 230) is further configured to receive the frequency down shifted discrete time series signal (120a, 220a); and
the output frequency shifter (140, 240) is further configured to receive the filtered and frequency down shifted discrete time series signal (130a, 230a).

8. A method of filtering a discrete time series signal with a band filter, the method comprising:
frequency down shifting the discrete time series signal to provide a frequency down shifted discrete time series signal;
using a high-pass higher order polynomial regression based zero frequency centered band filter to operate on an entire length of the frequency down shifted discrete time series signal and filter the frequency down shifted discrete time series signal to provide a filtered and frequency down shifted discrete time series signal; and
frequency up shifting the filtered and frequency down shifted discrete time series signal.

9. The method of claim 8, wherein frequency down shifting the discrete time series signal comprises multiplying the discrete time series signal by an exponent of a negatived frequency shift term $k_0$.

10. The method of claim 8, wherein frequency up shifting the filtered and frequency down shifted discrete time series signal comprises multiplying the filtered and frequency down shifted discrete time series signal by an exponent of the frequency shift term $k_0$.

11. The method of claim 8, wherein the high-pass higher order polynomial regression based zero frequency centered band filter comprises a polynomial regression smoothing filter.

12. The method of claim 8, wherein using the high-pass higher order polynomial regression based zero frequency centered band filter to filter the frequency down shifted discrete time series signal to provide a filtered and frequency down shifted discrete time series signal comprises using a polynomial regression filter to smooth the frequency down shifted discrete time series signal.

13. The method of claim 12, wherein using the high-pass higher order polynomial regression based zero frequency centered band filter to filter the frequency down shifted discrete time series signal to provide a filtered and frequency down shifted discrete time series signal further comprises using a summation to sum the smoothed and frequency down shifted discrete time series signal and the frequency down shifted discrete time series signal.

14. The method of claim 12, further comprising:
receiving with a feed forward loop receive the frequency down shifted discrete time series signal;
receiving with a summation the smoothed frequency down shifted time series signal from the polynomial regression filter;
receiving with the summation the frequency down shifted time series signal from the feed forward loop; and
summing with the summation the smoothed frequency down shifted discrete time series signal and the frequency down shifted discrete time series signal to provide a filtered and frequency down shifted discrete time series signal.

15. The method of claim 8, further comprising:
receiving the discrete time series signal with the input frequency shifter;
receiving the frequency down shifted discrete time series signal with the high-pass higher order polynomial regression based zero frequency centered band filter; and
receiving the filtered and frequency down shifted discrete time series signal with the output frequency shifter.

* * * * *